United States Patent
Li et al.

(10) Patent No.: US 9,274,570 B2
(45) Date of Patent: Mar. 1, 2016

(54) POSITIONING APPARATUS FOR EXPANSION CARD

(71) Applicant: ScienBiziP Consulting (Shen Zhen) Co., Ltd., Shenzhen (CN)

(72) Inventors: Sheng-He Li, Wuhan (CN); Chang-Ke Ke, Wuhan (CN); Xiao-Wen Duan, Wuhan (CN); Da-Long Sun, Wuhan (CN)

(73) Assignee: ScienBiziP Consulting(Shenzhen)Co.,Ltd., Shenzhen (CN)

(*) Notice: Subject to any disclaimer, the term of this patent is extended or adjusted under 35 U.S.C. 154(b) by 53 days.

(21) Appl. No.: 14/267,089

(22) Filed: May 1, 2014

(65) Prior Publication Data

US 2015/0036281 A1     Feb. 5, 2015

(30) Foreign Application Priority Data

Jul. 31, 2013  (CN) .......................... 2013 1 03282645

(51) Int. Cl.
   *G06F 1/16*     (2006.01)
   *G06F 1/18*     (2006.01)
(52) U.S. Cl.
   CPC ..................... *G06F 1/185* (2013.01)
(58) Field of Classification Search
   USPC ............ 455/456.1, 3.05; 361/679.32, 679.48, 361/679.02, 679.51, 679.33, 679.31, 679.6, 361/679.08, 679.58, 679.47, 679.54, 679.4, 361/679.55, 679.49, 679.37, 679.26, 361/679.46, 679.23, 679.53; 312/223.2, 312/220.21, 223.1, 293.2, 215, 222, 223.5, 312/223.6, 334.1, 348.4, 311, 328; 248/65, 248/674, 221.11, 346.3, 291.1, 274.1, 248/225.31, 345.1; 165/80.3, 80.2, 122, 165/104.21, 174, 185, 67, 121; 174/382, 174/51, 356, 363, 548, 366, 378
   See application file for complete search history.

(56) References Cited

U.S. PATENT DOCUMENTS

| | | | |
|---|---|---|---|
| 7,911,785 B2* | 3/2011 | Coglitore | H05K 7/1488 248/201 |
| 8,848,364 B2* | 9/2014 | Crane | G06F 1/20 361/679.51 |
| 2004/0075891 A1* | 4/2004 | Hwang | H01S 3/067 359/341.5 |

* cited by examiner

*Primary Examiner* — Hung Duong
(74) *Attorney, Agent, or Firm* — Novak Druce Connolly Bove + Quigg LLP

(57) ABSTRACT

A positioning apparatus includes a computer chassis and a positioning device. The computer chassis secures a plurality of expansion cards and includes a cover. The cover comprises a first flange and a second flange opposite to the first flange. The positioning device includes a securing member and a positioning member secured to the securing member. The securing member is secured to the first flange and a second flange. The positioning member is pressed on the plurality of expansion cards to prevent the plurality of expansion cards from moving.

18 Claims, 6 Drawing Sheets

POSITIONING APPARATUS FOR EXPANSION CARD

FIELD

The present disclosure relates to positioning apparatuses, and particularly to a positioning apparatus for positioning an expansion card in a computer chassis.

BACKGROUND

Computer systems usually include multiple expansion cards secured to a motherboard in a computer chassis, such as sound cards, video cards, graphics cards and so on, for enhancing capabilities of the computer system. However, when the computer chassis is moved, or the plurality of expansion cards is under in an impact test, the plurality of expansion cards often loosen, influencing the function and the test result.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
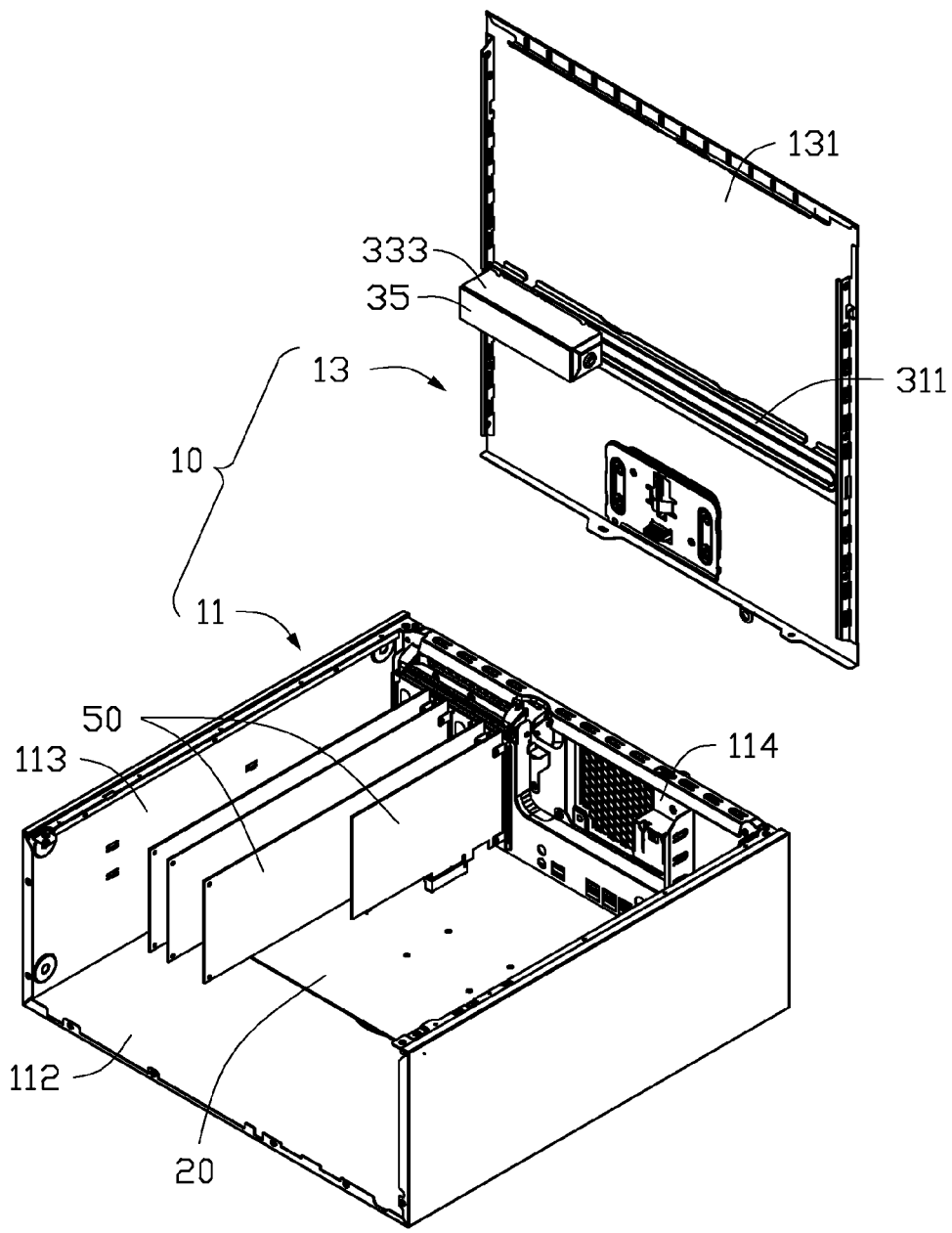
FIG. 1 is an exploded, isometric view of a positioning apparatus and a plurality of expansion cards in accordance with an embodiment.
Figure 2:
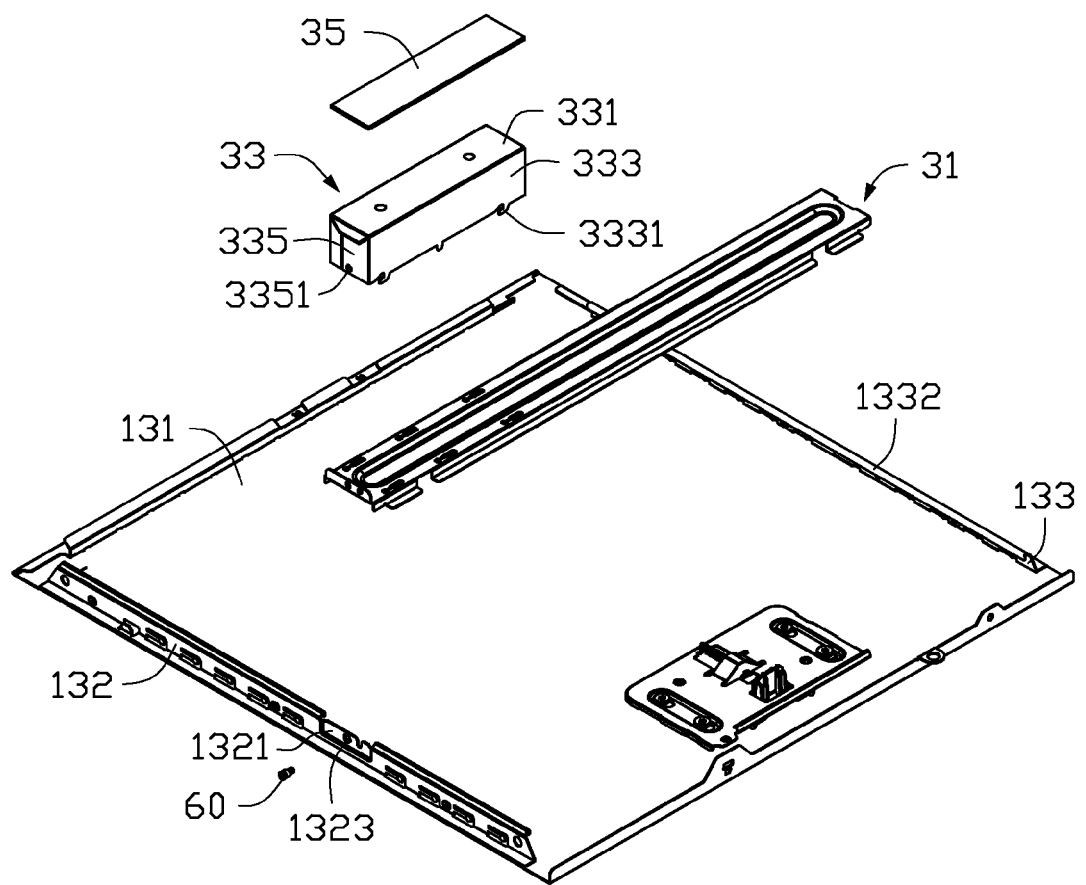
FIG. 2 is exploded, isometric view of a positioning member and a cover of the positioning apparatus of FIG. 1.
Figure 3:
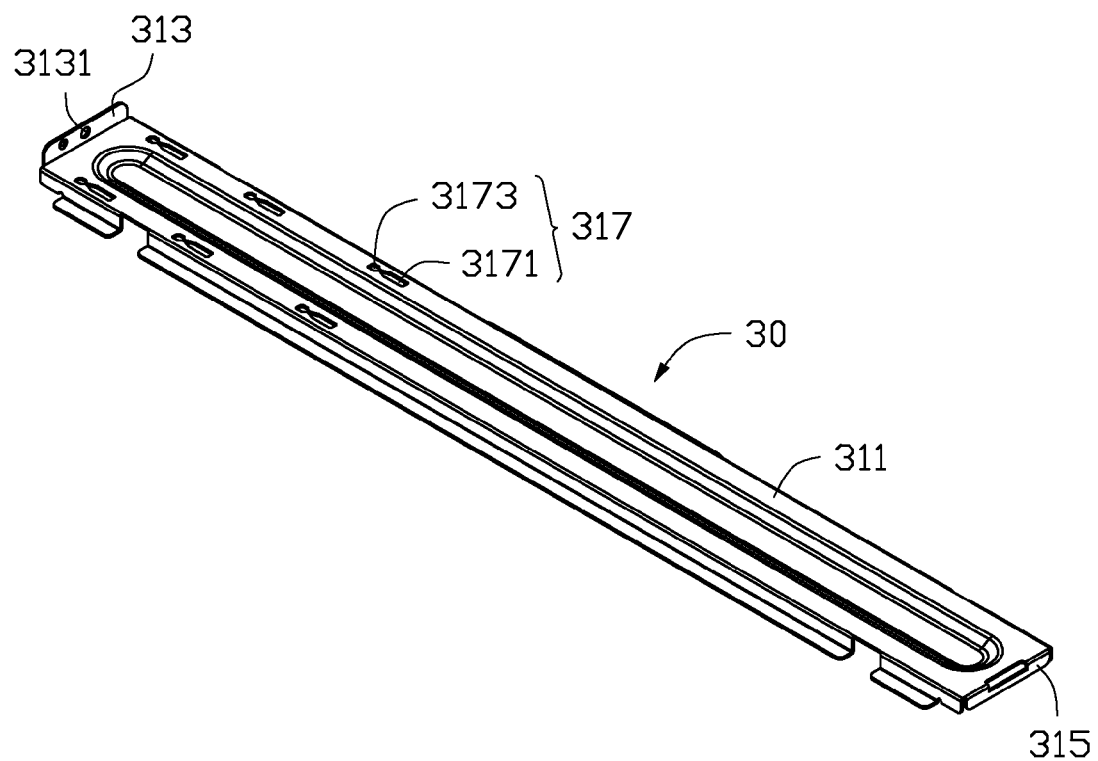
FIG. 3 is isometric view of a base of the positioning member of the positioning apparatus of FIG. 2.

FIGS. 1-3 illustrate a positioning apparatus in accordance with an embodiment. The positioning apparatus comprises a computer chassis 10 (only a part is shown) and a positioning device 30 attached to the computer chassis 10. The positioning device 30 is used to position a plurality of expansion cards 30 in the computer chassis 10 to prevent the plurality of expansion cards 30 from moving. The plurality of expansion cards 30 have a same height and can be sound cards, video cards, or graphics cards, for example, for enhancing capabilities of a computer system.

The computer chassis 10 comprises a main body 11 and a cover 13 covering the main body 11. The main body 11 comprises a bottom plate 112, two side plates 113, and a rear plate 114. A motherboard 20 is secured to the bottom plate 112. The plurality of expansion cards 50 is connected to the motherboard 20 and secured to the rear plate 114 by a means, such as clips, or screws. In at least one embodiment, the two side plates 113 are substantially parallel to each other and perpendicular to the bottom plate 112, and the rear plate 114 is substantially perpendicular to the bottom plate 112 and the two side plates 113.

The cover 13 can comprise a main panel 131, a first flange 132 connected to the main panel 131, and a second flange 133 connected to the main panel 131. A mounting portion 1321, with a mounting hole 1323, is located on the first flange 132. A curved portion 1332 is located on the second flange 133.

The positioning device 30 comprises a securing member 31, a positioning member 33, and a vibration absorbing member 35. The securing member 31 comprises a base 311, a first securing piece 313, and a second securing piece 315. The first securing piece 313 is substantially parallel to the second securing piece 315 and perpendicular to the base 311. In one embodiment, the first securing piece 313 extends from the base 311 along a first direction, and the second securing piece 315 extends from the base 311 along a second opposite direction. A plurality of sliding slots 317 is defined in the base 311. In one embodiment, the plurality of sliding slots 317 comprises six sliding slots 317 which are aligned in two lines. Each sliding slot 317 comprises a sliding portion 3171 and a clipping portion 3173 communicating with the sliding portion 3171. A diameter of the sliding portion 3171 is greater than a diameter of the clipping portion 3173. A securing hole 3131, corresponding to the mounting hole 1323, is defined in the first securing piece 313.

The positioning member 33 is substantially a box and comprises a top panel 331, two first opposite side panels 333, and a second side panels 335. A plurality of engaging portions 331, such as hooks, is located on a bottom portion of each first side panel 333. Each engaging portion 331 can be slid into the sliding portion 3171 to engage with the clipping portion 3173. In one embodiment, each engaging portion 331 is substantially L-shaped. A fixing hole 3351, corresponding to the mounting hole 1323 and the securing hole 3131, is defined in the second side panel 335.

The vibration absorbing member 35 can be secured to the top panel 331 by a manner, such as screws or adhesive. In at least one embodiment, the vibration absorbing member 35 is a foam.

Figure 4:
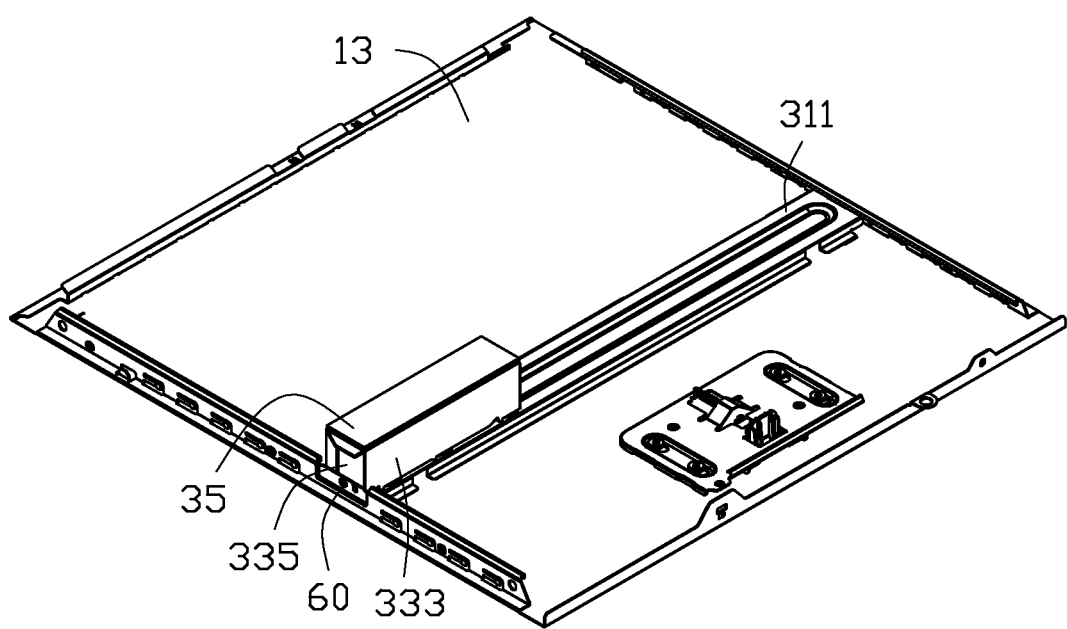
FIG. 4 is an assembled view of the positioning member and the cove of FIG. 2.
Figure 5:
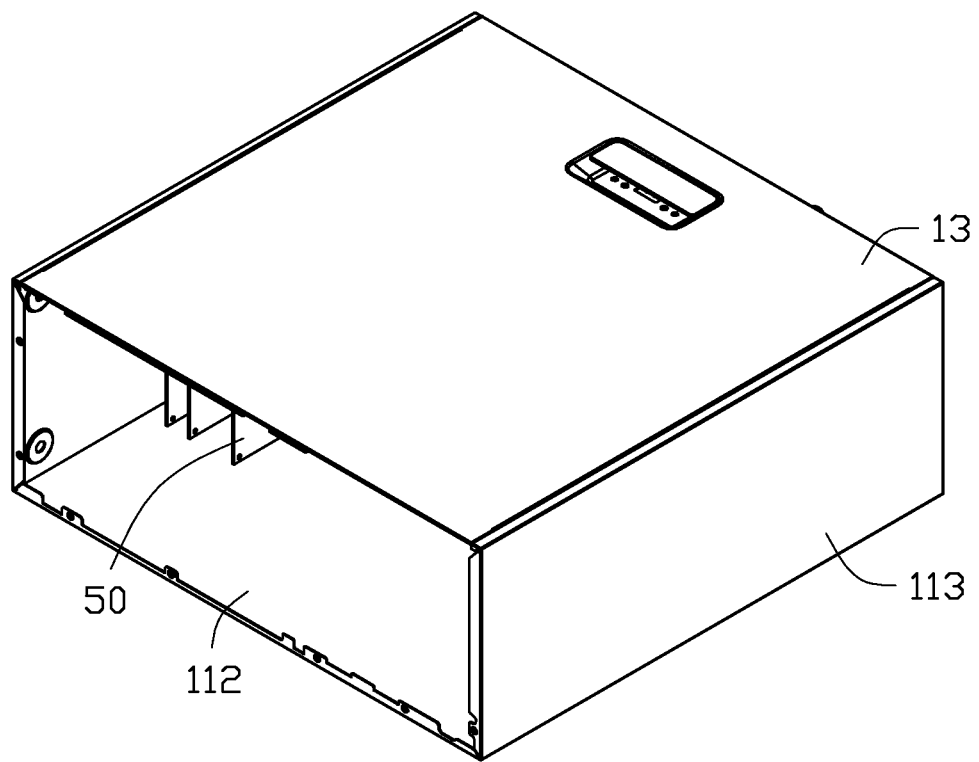
FIG. 5 is an assembled view of the plurality of expansion card and the positioning apparatus of FIG. 1.
Figure 6:
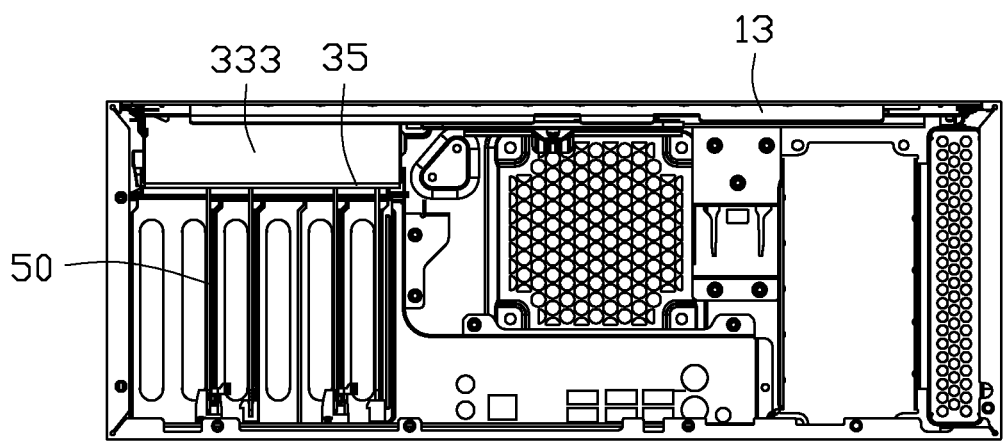
FIG. 6 is a side view of the plurality of expansion card and the positioning apparatus of FIG. 5.

FIGS. 4-6 illustrate assembly of the positioning apparatus of an embodiment. The securing member 31 is located between the first flange 132 and the second flange 133. The second securing piece 315 is inserted between the curved portion 1332 and the main panel 131, to engage the second securing piece 315 to the curved portion 1332.

The positioning member 33 is located on the base 311, and each engaging portion 331 is slid into the each sliding portion 3171. The positioning member 33 is moved along a direction that is substantially parallel to the main panel 131, and the engaging portion 331 is slid to engage in the clipping portion 3173. The fixing hole 3351 is aligned with the securing hole 3131 and the mounting hole 1323. A fixing member 60 is engaged in the fixing hole 3351, the securing hole 3131 and the mounting hole 1323, to secure the second side panel 335 to the first securing piece 313 and the first flange 132.

The vibration absorbing member 35 is secured to the top panel 331 by means, such as screws and adhesive. Thus, the positioning device 30 is secured to the cover 13.

In use, the plurality of expansion cards 50 is secured to the main body 11. A distance between the top edge of the expansion cards 50 and the cover 13 is substantially equal to a distance between the vibration absorbing member 35 and the cover 13. Thus, when the cover 13 is covering the main body 11, the vibration absorbing member 35 can be pressed on the top edge of the plurality of expansion cards 50, to prevent the plurality of expansion cards 50 from moving. When the plurality of expansion cards 50 needs to be detached, the cover 13 is removed from the main body 11, and the plurality of expansion cards 50 can be detached from the motherboard 11.

The positioning device 30 can be a vibration absorbing device which is made of vibration-absorptive material, so the positioning member 331 can be directly attached to the plurality of expansion cards 50 without the vibration absorbing member 35.

It is to be understood, that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure. The described embodiments are illustrative, and should not limit the following claims.

What is claimed is:

1. A positioning apparatus comprising:
   a computer chassis comprising a main body and a cover attached to the main body; the main body comprising a motherboard, the motherboard is configured for securing a plurality of expansion cards; and
   a positioning device comprising a securing member and a positioning member secured to the securing member; the securing member secured to the cover of the computer chassis;
   wherein when the cover is covered on the main body, the positioning member is pressed on the plurality of expansion cards to prevent the plurality of expansion cards from moving.

2. The positioning apparatus of claim 1, wherein the positioning further comprises a vibration absorbing member attached to the positioning member, and the vibration absorbing member is configured to press on the plurality of expansion cards.

3. The positioning apparatus of claim 2, wherein the positioning member comprises a top panel that is substantially parallel to the cover, and the vibration absorbing member is secured to the top panel.

4. The positioning apparatus of claim 3, wherein the positioning member further comprises a first side panel substantially perpendicular to the top panel, and the first side panel is engaged with the securing member.

5. The positioning apparatus of claim 4, wherein the securing member defines a sliding slot, and the first side panel comprises an engaging portion engaged in the sliding slot.

6. The positioning apparatus of claim 5, wherein the sliding slot comprises a sliding portion and a clipping portion communicating with the sliding portion, and the engaging portion is slid into the sliding portion to engage in the clipping portion.

7. The positioning apparatus of claim 5, wherein the engaging portion is substantially L-shaped and extends from the first side panel.

8. The positioning apparatus of claim 1, wherein the securing member comprises a first securing piece, the positioning member comprises a second side panel, the cover comprises a first flange, and the first flange is secured to the second side panel and the first securing piece.

9. The positioning apparatus of claim 8, wherein the cover further comprises a main panel and a second flange substantially parallel to the first flange, the second flange comprises a curved portion, the securing member further comprises a second securing piece substantially parallel to the first securing piece, and the second securing piece is located between the curved portion and the main panel.

10. The positioning apparatus of claim 1, wherein the securing member comprises a first securing piece, the positioning member comprises a second side panel, the cover comprises a first flange, and the first flange is secured to the second side panel and the first securing piece.

11. The positioning apparatus of claim 10, wherein the cover further comprises a main panel and a second flange substantially parallel to the first flange, the second flange comprises a curved portion, the securing member further comprises a second securing piece substantially parallel to the first securing piece, and the second securing piece is located between the curved portion and the main panel.

12. A positioning apparatus comprising:
    a computer chassis configured for securing a plurality of expansion cards and comprising a cover; the cover comprises a first flange and a second flange opposite to the first flange;
    a positioning device comprising a securing member and a positioning member secured to the securing member; the securing member secured to the first flange and a second flange;
    wherein the positioning member is configured to be pressed on the plurality of expansion cards to prevent the plurality of expansion cards from moving.

13. The positioning apparatus of claim 12, wherein the positioning further comprises a vibration absorbing member attached to the positioning member, and the vibration absorbing member is configured to press on the plurality of expansion cards.

14. The positioning apparatus of claim 13, wherein the positioning member comprises a top panel that is substantially parallel to the cover, and the vibration absorbing member is secured to the top panel.

15. The positioning apparatus of claim 14, wherein the positioning member further comprises a first side panel substantially perpendicular to the top panel, and the first side panel is engaged with the securing member.

16. The positioning apparatus of claim 15, wherein the securing member defines a sliding slot, and the first side panel comprises an engaging portion engaged in the sliding slot.

17. The positioning apparatus of claim 16, wherein the sliding slot comprises a sliding portion and a clipping portion communicating with the sliding portion, and the engaging portion is slid into the sliding portion to engage in the clipping portion.

18. The positioning apparatus of claim 16, wherein the engaging portion is substantially L-shaped and extends from the first side panel.

\* \* \* \* \*